United States Patent
Sakurai

(10) Patent No.: US 7,346,324 B2
(45) Date of Patent: Mar. 18, 2008

(54) GROUNDED-EMITTER CIRCUIT, AND HIGH-FREQUENCY RECEIVER AND HIGH-FREQUENCY TRANSMITTER USING THE SAME

(75) Inventor: Shoji Sakurai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 247 days.

(21) Appl. No.: 10/921,230

(22) Filed: Aug. 19, 2004

(65) Prior Publication Data

US 2005/0070244 A1     Mar. 31, 2005

(30) Foreign Application Priority Data

Sep. 29, 2003    (JP)    ............... 2003-337662

(51) Int. Cl.
    *H04B 1/18*    (2006.01)
(52) U.S. Cl. ..................................... 455/285; 455/302
(58) Field of Classification Search ............... 455/296, 455/302, 307, 311, 280, 283, 285; 327/478, 327/551, 552, 553
See application file for complete search history.

(56) References Cited

U.S. PATENT DOCUMENTS

| | | | | |
|---|---|---|---|---|
| 3,702,897 A | * | 11/1972 | Hidaka et al. | ............... 348/654 |
| 5,929,707 A | | 7/1999 | Samuels | |
| 5,959,515 A | * | 9/1999 | Cornett et al. | ................ 334/14 |
| 6,424,222 B1 | | 7/2002 | Jeong et al. | |
| 6,859,103 B2 | * | 2/2005 | Yeh | ............................ 330/285 |
| 7,042,294 B2 | * | 5/2006 | Goss | ........................... 330/302 |
| 2002/0044025 A1 | * | 4/2002 | Park | ........................... 332/123 |
| 2002/0190796 A1 | | 12/2002 | Park et al. | |

FOREIGN PATENT DOCUMENTS

| | | | |
|---|---|---|---|
| DE | 3524112 C | * | 1/1987 |
| GB | 2 268 348 A | * | 1/1994 |
| JP | 63-92106 A | | 4/1988 |
| JP | 64-16005 A | | 1/1989 |
| JP | 5-327358 A | | 12/1993 |
| JP | 6-343088 A | | 12/1994 |
| JP | 9-64649 A | | 3/1997 |
| JP | 10-107554 A | | 4/1998 |
| JP | 2002-43869 A | | 2/2002 |
| JP | 2004-522350 A | | 7/2004 |
| WO | WO-02/080357 A1 | | 10/2002 |

* cited by examiner

*Primary Examiner*—Nguyen T. Vo
(74) *Attorney, Agent, or Firm*—Birch, Stewart, Kolasch & Birch, LLP

(57) ABSTRACT

A grounded-emitter circuit is composed of a transistor, a first impedance circuit, and a second impedance circuit. The transistor is an NPN transistor, and the base of the transistor is an input terminal of the grounded-emitter circuit. The emitter of the transistor is grounded to GND via the second impedance circuit. The collector of the transistor is connected to a reference voltage source via the first impedance circuit, and is an output terminal of the grounded-emitter circuit. Further, the second impedance circuit is composed of a parallel resonance circuit consisting of an inductor and a capacitor. With this, it is possible to provide a grounded-emitter circuit capable of being built in an IC, and capable of removing an image frequency signal in a simple circuit configuration.

8 Claims, 11 Drawing Sheets

GROUNDED-EMITTER CIRCUIT, AND HIGH-FREQUENCY RECEIVER AND HIGH-FREQUENCY TRANSMITTER USING THE SAME

This Nonprovisional application claims priority under 35 U.S.C. § 119(a) on Patent Application No. 337662/2003 filed in Japan on Sep. 29, 2003, the entire contents of which are hereby incorporated by reference.

FIELD OF THE INVENTION

The present invention relates to a grounded-emitter circuit; and a transmitter and receiver used in a high frequency band of a wireless communications system, etc.

BACKGROUND OF THE INVENTION

As an architecture for a receiver of a wireless communications system, a heterodyne system is widely known. The system is to convert an RF reception signal into a low-frequency signal (IF signal) using a frequency converter (mixer). An example of the arrangement and operation of a heterodyne receiver will be explained with reference to FIG. 12. The RF reception signal is amplified by an LNA circuit 8, and an image frequency component of the RF reception signal is removed by an image removing filter 9. Then, by a frequency converter 10, the signal is multiplied by an oscillation frequency component of a local oscillator 15 and converted into an IF signal. After an unwanted frequency component of the IF signal is removed by a bandpass filter 11, the signal is amplified to an appropriate level by an amplifier 12, demodulated by a demodulator 13, and output after an unwanted frequency component of the signal is removed by a lowpass filter 14.

A significant problem in the heterodyne system is an image signal. In the heterodyne system, high frequency and low frequency bands that are located symmetrically to each other on the axis of frequency with respect to the local frequency are converted to the same frequency band. Therefore it is necessary to remove an image signal that is located opposite to a desired reception signal on the axis of frequency with respect to the local frequency. FIG. 13 shows a spectrum of these signals. The most common way to remove the image signal is to provide a filter for image removing at a preceding stage of the frequency converter, as explained earlier. However, it is difficult to integrate such an image removing filter into a semiconductor IC. Consequently, the image removing filter prevents the reduction of the size and cost of a high-frequency receiver.

In view of this, an invention of an image removing frequency converter that does not require the image removing filter is disclosed in Japanese Unexamined Patent Publication No. 6-343088 (Tokukaihei 6-343088, published on Dec. 13, 1994) and Japanese Unexamined Patent Publication No. 9-64649 (Tokukaihei 9-64649, published on Mar. 7, 1997), for example. Basically, the image removing frequency converter applies respectively different phase shift operations to the desired frequency signal and the image signal, and cancels the image signal by adding to the image signal, a signal of reversed polarity with respect to the image signal. The phase shift operations are performed using a 90-degree phase shifter. If built in a semiconductor IC, however, the 90-degree phase shifter generates errors in output level and phase, due to process variation, a parasitic component, and the like, and these errors prevent sufficient canceling of the image signal. As a result, the yield of ICs is lowered.

Next, an example of a high-frequency transmitter will be explained with reference to FIG. 14. After an unwanted frequency component of a transmission baseband signal is removed by a lowpass filter 16, the transmission baseband signal is modulated by a modulator 17, and amplified to an appropriate level by an amplifier 18. Then, after an unwanted frequency component of the signal is removed by a bandpass filter 19, the signal is supplied to a frequency converter 20. The frequency converter 20 multiplies the input signal by a frequency component of a local oscillator 23, so as to convert the input signal into a high-frequency signal. After an unwanted frequency component such as an unwanted side band component of the converted high-frequency signal is removed by a bandpass filter 21, the high-frequency signal is amplified by a power amplifier 22 and output.

In such a high-frequency transmitter, the frequency converter 20 outputs in addition to the desired output signal, an unwanted side band signal at a position symmetrical to the desired output signal on the axis of frequency with respect to the local frequency. FIG. 15 shows a spectrum of these signals. In order to remove the unwanted side band signal component, the bandpass filter or image removing frequency converter is required. However, the bandpass filter and image removing frequency converter prevent reduction of the size and cost of the high-frequency transmitter, or lower the yield of ICs, as explained earlier.

As described above, a transmitter and receiver employing a frequency converter requires an image removing filter or an image removing frequency converter in order to remove an unwanted frequency component. However, the image removing filter is difficult to be integrated into an IC, thus becoming a problem in reducing the size and cost of the transmitter and receiver. Further, the image removing frequency converter requires a 90-degree phase shifter. This complicates the circuit, and increases the power consumption of the transmitter and receiver. Moreover, the 90-degree phase shifter generates a level error and phase error due to process variation, thus causing such a problem that the yield of ICs is lowered.

SUMMARY OF THE INVENTION

The present invention has an objective to provide a grounded-emitter circuit capable of being built in an IC, and capable of removing an image frequency signal using a simple circuit configuration; and a high-frequency receiver and high-frequency transmitter using the same.

In order to achieve the foregoing objectives, a grounded-emitter circuit of the present invention which includes a transistor, a first impedance circuit connected between a collector of the transistor and a reference voltage source, and a second impedance circuit connected between an emitter of the transistor and GND is arranged so that the second impedance circuit is composed of a parallel resonance circuit consisting of an inductor and a capacitor.

The grounded-emitter circuit of the present invention is arranged so that the inductor of the second impedance circuit is a spiral inductor provided on a semiconductor substrate.

The grounded-emitter circuit of the present invention is arranged so that the capacitor of the second impedance circuit is a variable capacitor.

With these arrangements, the impedance of the second impedance circuit is composed of a parallel resonance circuit consisting of an inductor and a capacitor. Since the impedance of an LC parallel resonance circuit is extremely large with respect to a frequency in the vicinity of the resonance frequency, the transfer conductance of the grounded-emitter circuit becomes extremely small with respect to a frequency in the vicinity of the resonance frequency. Consequently, if a signal whose frequency is in the vicinity of the resonance frequency is supplied to the grounded-emitter circuit, the signal is output after remarkably attenuated. This enables the grounded-emitter circuit to attenuate an unwanted frequency component.

With this, it is possible to provide a grounded-emitter circuit capable of being built in an IC, and, in a simple circuit configuration, capable of removing an image frequency signal.

The grounded-emitter circuit of the present invention is arranged so that the first impedance circuit is a parallel resonance circuit consisting of an inductor and a capacitor, and has a resonance frequency different from a resonance frequency of the second impedance circuit.

The grounded-emitter circuit of the present invention is arranged so that the inductor of the first impedance circuit is a spiral inductor provided on a semiconductor substrate.

The grounded-emitter circuit of the present invention is arranged so that the capacitor of the first impedance circuit is a variable capacitor.

With these arrangements, in addition to the second impedance circuit whose impedance is a parallel resonance circuit consisting of an inductor and a capacitor, the load impedance circuit provided between the reference voltage and the collector of the transistor is composed of a parallel resonance circuit consisting of an inductor and a capacitor. As described earlier, the impedance of an LC parallel resonance circuit is extremely large with respect to a frequency in the vicinity of the resonance frequency. This enables the grounded-emitter circuit to increase the load impedance and the transfer conductance with respect to a certain frequency. Since the resonance frequency of the first impedance circuit is set differently from the resonance frequency of the second impedance circuit, it is possible to attenuate a certain frequency component and amplify another frequency component at the same time.

A high-frequency receiver of the present invention is arranged so as to include a frequency converter; and the grounded-emitter circuit provided at a preceding stage of the frequency converter, a resonance frequency of the parallel resonance circuit of the second impedance circuit being set in a vicinity of an image frequency of the frequency converter.

A high-frequency receiver of the present invention is arranged so as to include a frequency converter; and the grounded-emitter circuit provided at a preceding stage of the frequency converter, the resonance frequency of the parallel resonance circuit of the second impedance circuit being set in a vicinity of an image frequency of the frequency converter, the resonance frequency of the parallel resonance circuit of the first impedance circuit being set in a vicinity of a desired signal frequency of the receiver.

With these arrangements, a grounded-emitter circuit that can attenuate a certain frequency component is provided at a preceding stage of the frequency converter. Therefore it is possible to remove an image frequency component which causes a problem in the frequency converter. This can eliminate the need for an image removing filter and an image removing frequency converter. Further, since the resonance frequency of the parallel resonance circuit of the first impedance circuit is set in the vicinity of the desired signal frequency of the receiver, it is possible to increase a level difference between the desired frequency component and the image frequency component.

A high-frequency receiver of the present invention is arranged so as to include a frequency converter; the grounded-emitter circuit provided at a preceding stage of the frequency converter; and a control section controlling the variable capacitor of the second impedance circuit.

A high-frequency receiver of the present invention is arranged so as to include a frequency converter; the grounded-emitter circuit provided at a preceding stage of the frequency converter; and a control section controlling the variable capacitor of the first impedance circuit.

Values of an inductor and a capacitor integrated in an IC vary due to process variation, a parasitic component, and the like. This may vary the resonance frequency of the LC parallel resonance circuit, preventing the LC parallel resonance circuit from achieving desired characteristics. With the foregoing arrangements, the variable capacitor of the LC parallel resonance circuit is controllable. With this, it is possible to adjust the resonance frequency so as to achieve optimum characteristics.

A high-frequency receiver of the present invention is arranged so as to include a frequency converter; the grounded-emitter circuit provided at a preceding stage of the frequency converter; a signal generating section generating a signal whose frequency is equal to an image frequency of the frequency converter; a field intensity detecting section detecting an output level of the grounded-emitter circuit; and a control section controlling in accordance with a detected level of the output level, a capacitance value of the variable capacitor of the second impedance circuit.

A high-frequency receiver of the present invention is arranged so as to include a frequency converter; the grounded-emitter circuit provided at a preceding stage of the frequency converter; a signal generating section generating a signal whose frequency is equal to a desired signal frequency of the receiver; a field intensity detecting section detecting an output level of the grounded-emitter circuit; and a control section controlling in accordance with a detected level of the output level, a capacitance value of the variable capacitor of the first impedance circuit.

With these arrangements, in a case where the signal generating section of the high-frequency receiver outputs a signal whose frequency is equal to the image frequency of the frequency converter, the grounded-emitter circuit attenuates this signal. If a current component of the image frequency contained in the output signal from the grounded-emitter circuit is large, a radiation field due to the current is also large. Hence the radiation field of the output signal is detected by the field intensity detecting section. If the output level is higher than a desired level, the control section changes the capacitance value of the variable capacitor, so as to attenuate the output level. With this, it is possible to adjust the resonance frequency of the LC parallel resonance circuit so as to achieve desired characteristics, even if the resonance frequency varies due to process variation, a parasitic component, and the like.

On the other hand, in a case where the signal generating section of the high-frequency receiver outputs a signal whose frequency is equal to the desired frequency, it is possible to achieve similar effects by adjusting the variable capacitor so as to increase the output level.

A high-frequency transmitter of the present invention is arranged so as to include a frequency converter; and the grounded-emitter circuit provided at a subsequent stage of the frequency converter, a resonance frequency of the parallel resonance circuit of the second impedance circuit being set in a vicinity of an unwanted side band frequency of the frequency converter.

A high-frequency transmitter of the present invention is arranged so as to include a frequency converter; and the grounded-emitter circuit provided at a subsequent stage of the frequency converter, the resonance frequency of the parallel resonance circuit of the second impedance circuit being set in a vicinity of an unwanted side band frequency of the frequency converter, the resonance frequency of the parallel resonance circuit of the first impedance circuit being set in a vicinity of a desired output signal frequency of the transmitter.

With these arrangements, a grounded-emitter circuit that can attenuate a certain frequency component is provided at a subsequent stage of the frequency converter. Therefore it is possible to remove a side band frequency component which causes a problem in the frequency converter. This can eliminate the need for an image removing filter and an image removing frequency converter. Further, if the resonance frequency of the parallel resonance circuit of the first impedance circuit is set in the vicinity of the desired output signal frequency of the transmitter, it is possible to increase a level difference between the desired frequency component and the side band signal component.

A high-frequency transmitter of the present invention is arranged so as to include a frequency converter; the grounded-emitter circuit provided at a subsequent stage of the frequency converter; and a control section controlling the variable capacitor of the second impedance circuit.

A high-frequency transmitter of the present invention is arranged so as to include a frequency converter; the grounded-emitter circuit provided at a subsequent stage of the frequency converter; and a control section controlling the variable capacitor of the first impedance circuit.

With these arrangements, even if the resonance frequency of the LC parallel resonance circuit varies because values of an inductor and a capacitor integrated in an IC vary due to process variation, a parasitic component, and the like, it is possible to adjust the resonance frequency by controlling the variable capacitor of the LC parallel resonance circuit, so as to achieve optimum characteristics.

A high-frequency transmitter of the present invention is arranged so as to include a frequency converter; the grounded-emitter circuit provided at a subsequent stage of the frequency converter; a signal generating section generating a signal whose frequency is equal to an unwanted side band frequency of the frequency converter; a field intensity detecting section detecting an output level of the grounded-emitter circuit; and a control section controlling in accordance with a detected level of the output level, a capacitance value of the variable capacitor of the second impedance circuit.

A high-frequency transmitter of the present invention is arranged so as to include a frequency converter; the grounded-emitter circuit provided at a subsequent stage of the frequency converter; a signal generating section generating a signal whose frequency is equal to a desired output signal frequency of the transmitter; a field intensity detecting section detecting an output level of the grounded-emitter circuit; and a control section controlling in accordance with a detected level of the output level, a capacitance value of the variable capacitor of the first impedance circuit.

With these arrangements, in a case where the signal generating section of the high-frequency transmitter outputs a signal whose frequency is equal to the side band frequency of the frequency converter, the grounded-emitter circuit attenuates this signal. Then, the output level of the grounded-emitter circuit is detected by the field intensity detecting section. If the output level is higher than a desired level, the control section attenuates the output level. With this, it is possible to adjust the resonance frequency of the LC parallel resonance circuit so as to achieve desired characteristics, even if the resonance frequency varies due to process variation, a parasitic component, and the like. On the other hand, in a case where the signal generating section of the high-frequency receiver outputs a signal whose frequency is equal to the desired frequency, it is possible to achieve similar effects by adjusting the variable capacitor so as to increase the output level.

For a fuller understanding of the nature and advantages of the invention, reference should be made to the ensuing detailed description taken in conjunction with the accompanying drawings.

DETAILED DESCRIPTION OF THE PREFERRED EMBODIMENTS

With reference to FIGS. 1 through 11, the following will explain an embodiment of the present invention.

Figure 11:
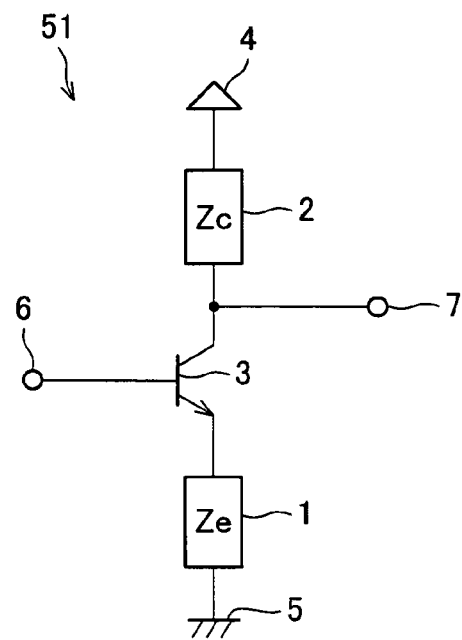
FIG. 11 is a circuit block diagram showing an arrangement of a grounded-emitter circuit which is a basic model of an embodiment of the present invention.

First, FIG. 11 shows a grounded-emitter circuit 51 which is a basic model of a grounded-emitter circuit in accordance with the present embodiment. The grounded-emitter circuit 51 is a grounded-emitter amplification circuit in which the emitter of a transistor is grounded to GND via an impedance. The grounded-emitter circuit 51 is provided with a transistor 3, a first impedance circuit 2, and a second impedance circuit 1. The transistor 3 is an NPN transistor, and the base of the transistor 3 is an input terminal 6 of the grounded-emitter circuit 51. The emitter of the transistor 3 is grounded to GND 5 via the second impedance circuit 1. The collector of the transistor 3 is connected to a reference voltage source 4 via the first impedance circuit 1, and is an output terminal 7 of the grounded-emitter circuit 51.

In the grounded-emitter circuit 51 as described above, if an impedance of the second impedance 1 is Ze, then a transfer conductance of the grounded-emitter circuit 51 is $1/(1+gm \cdot Ze)$, where gm is a mutual conductance of the transistor 3. This is called emitter degeneration. With this, if Ze increases, the transfer conductance of the grounded-emitter circuit 51 decreases, and an input signal supplied to the grounded-emitter circuit 51 is output after attenuated more. Namely, a voltage of an AC signal component contained in an input signal that is supplied to the input terminal 6 is divided into (i) a portion of voltage drop at the second impedance circuit 1 due to a collector current in accordance with a frequency of the AC signal component and (ii) a portion of change of a base-emitter voltage of the transistor 3. Here, the change of the base-emitter voltage with respect to the AC signal voltage of the frequency decreases, and thus a portion of the voltage that contributes to the amplification decreases.

A path to which the first impedance circuit 2 is connected is additionally provided with, when appropriate, a load for setting bias to an output signal to be outputted through the output terminal 7, and a load for attenuating the size of an AC current flowing through the path. If an AC current at a certain frequency is small in a current flowing through the first impedance circuit 2, an output current from the output terminal 7 becomes large. This is because the output current is obtained by subtracting from the collector current (substantially equal to an emitter current), the AC current of the certain frequency which flows through the second impedance circuit 1. If the current flowing through the first impedance circuit 2 does not contain the AC current component of the certain frequency, the certain frequency component in the output current is a current having the same size as the collector current and having opposite phase to the collector current. Therefore if the transfer conductance with respect to an AC signal of a certain frequency is small, the output current of the grounded-emitter circuit 51 with respect to the AC signal is also small.

Figure 1:
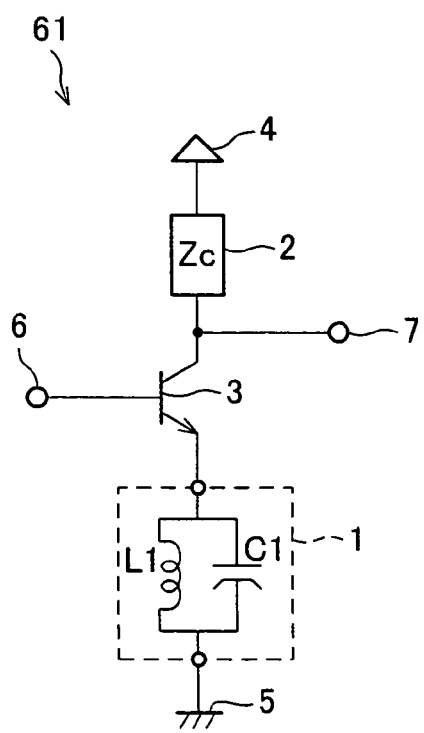
FIG. 1 is a circuit block diagram showing an arrangement of a grounded-emitter circuit in accordance with an embodiment of the present invention.

Next, FIG. 1 shows an arrangement of a grounded-emitter circuit 61 in accordance with the present embodiment. Note that, the same reference symbols are assigned to members which are equivalent to those shown in FIG. 11. In the present embodiment, the grounded-emitter circuit 61 functions as a circuit for attenuating specific frequency signals. The grounded-emitter circuit 61 is arranged so that, in the grounded-emitter circuit 51 shown in FIG. 11, the second impedance circuit 1 is composed of a parallel resonance circuit consisting of an inductor L1 and a capacitor C1. With this, the grounded-emitter circuit 61 has an arrangement capable of being built in an IC. Note that, the inductor L1 of the second impedance circuit 1 may be a spiral inductor provided on a semiconductor substrate, which is an inductor suitably built in an IC. Further, the capacitor C1 may be a variable capacitor.

Figure 2:
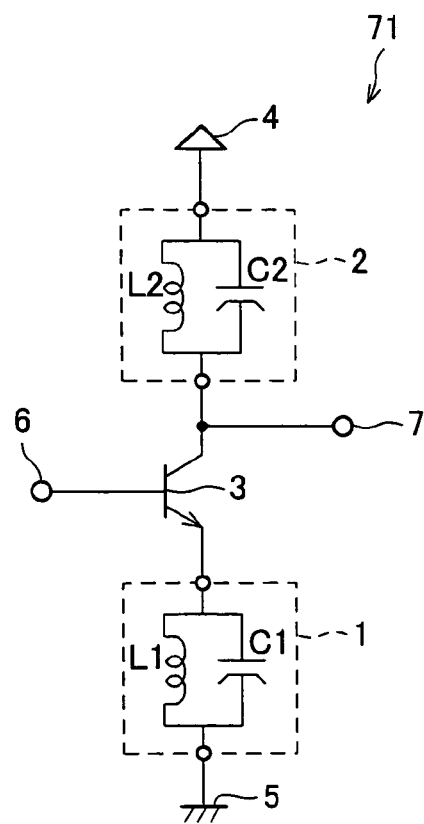
FIG. 2 is a circuit block diagram showing another arrangement of a grounded-emitter circuit in accordance with an embodiment of the present invention.

FIG. 2 shows an arrangement of a grounded-emitter circuit 71, which concretely shows an arrangement of the first impedance circuit 2 of the grounded-emitter circuit 61. In the present embodiment, the grounded-emitter circuit 71 functions as a circuit for attenuating specific frequency signals. The grounded-emitter circuit 71 is arranged so that the first impedance circuit is composed of a parallel resonance circuit consisting of an inductor L2 and a capacitor C2. With this, the grounded-emitter circuit 71 has an arrangement capable of being built in an IC. Note that, the inductor L2 of the first impedance circuit 2 may be a spiral inductor provided on a semiconductor substrate, which is an inductor suitably built in an IC. Further, the capacitor C2 may be a variable capacitor.

Figure 3:
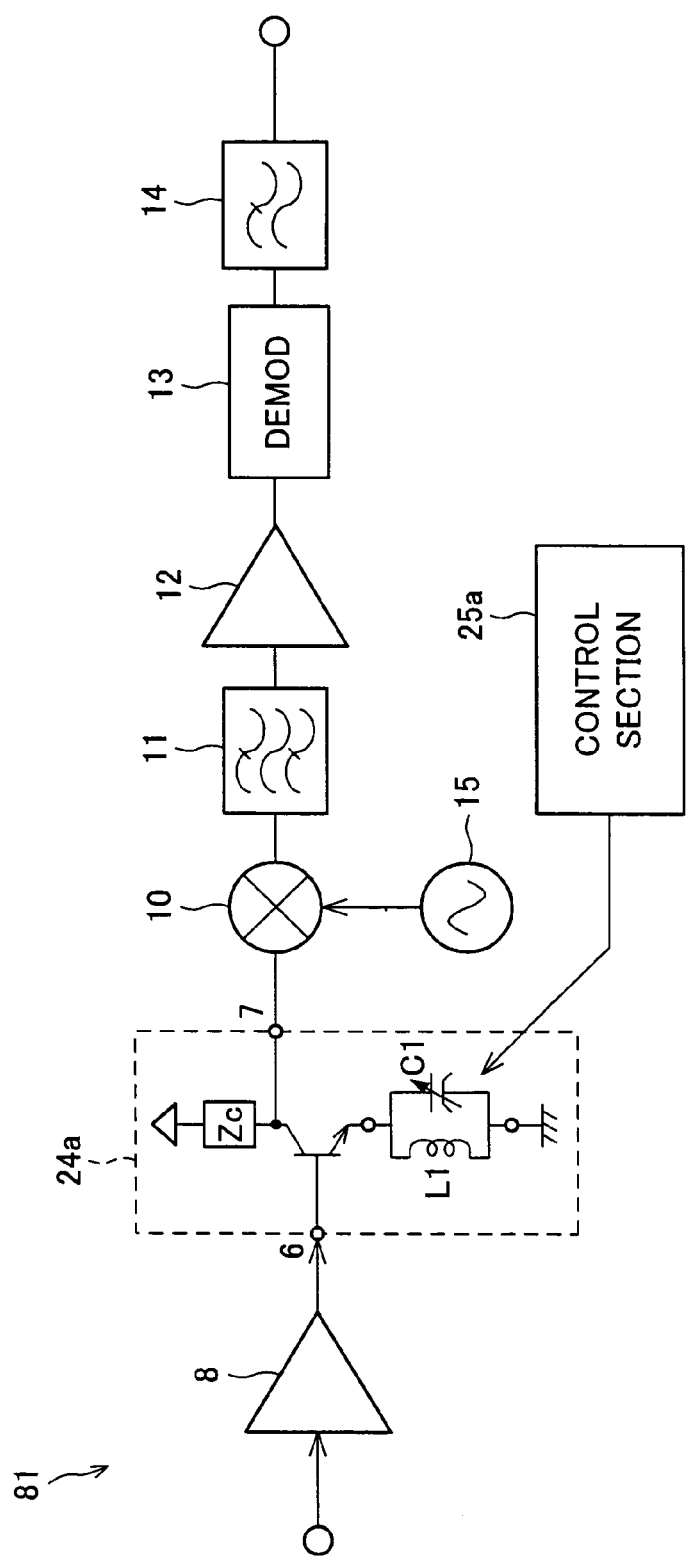
FIG. 3 is a block diagram showing an arrangement of a high-frequency receiver in accordance with an embodiment of the present invention.
Figure 12:
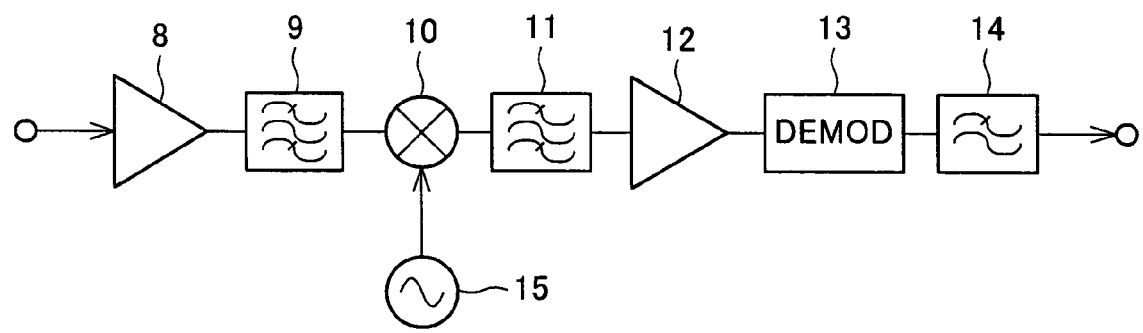
FIG. 12 is a block diagram showing an arrangement of a conventional high-frequency receiver.
Figure 13:
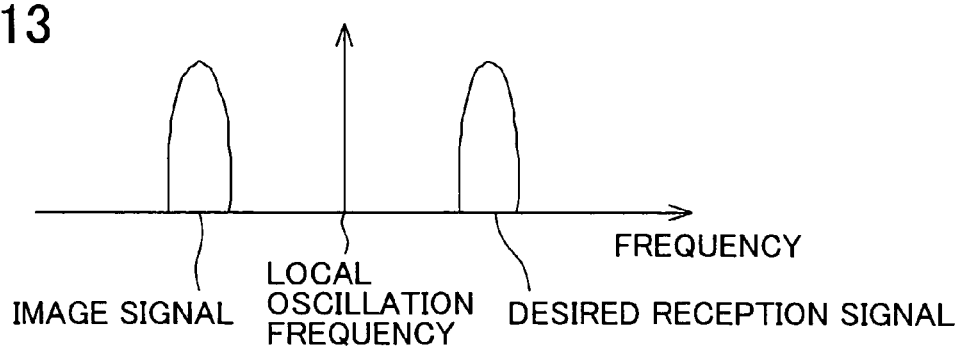
FIG. 13 is a signal spectrum of the high-frequency receiver of FIG. 12.

Next, FIG. 3 shows an arrangement of a high-frequency receiver 81 in accordance with the present embodiment. Note that, the same reference symbols are assigned to members equivalent to those used in FIG. 12. Further, the members equivalent to those used in FIG. 12 have same functions as those used in FIG. 12, thus their explanation is omitted here. An RF reception signal is amplified by the LNA circuit 8, and supplied to a grounded-emitter circuit 24a. The grounded-emitter circuit 24a is arranged so that the capacitor C1 of the grounded-emitter circuit 61 shown in FIG. 1 is a variable capacitor. Further, a control section (control means) 25a which controls a capacitance value of the capacitor C1 is provided to the high-frequency receiver 81. An output signal of the grounded-emitter circuit 24a is supplied to the frequency converter 10. A resonance frequency of the LC parallel resonance circuit of the grounded-emitter circuit 24a is set in the vicinity of an image frequency of the frequency converter 10. Accordingly, as explained at the beginning of DETAILED DESCRIPTION OF THE PREFERRED EMBODIMENT, Ze with respect to a frequency in the vicinity of the image frequency becomes large, and the transfer conductance becomes small. With this, the grounded-emitter circuit 24a, like an image removing filter, remarkably attenuates the image frequency component. Therefore the high-frequency receiver 81 does not require an image removing filter or an image removing frequency converter. Further, even if the resonance frequency varies due to process variation, etc., it is possible to achieve a desired resonance frequency by adjusting by the control section 25a, a capacitance value of the capacitor C1 in the LC parallel resonance circuit.

Figure 4:
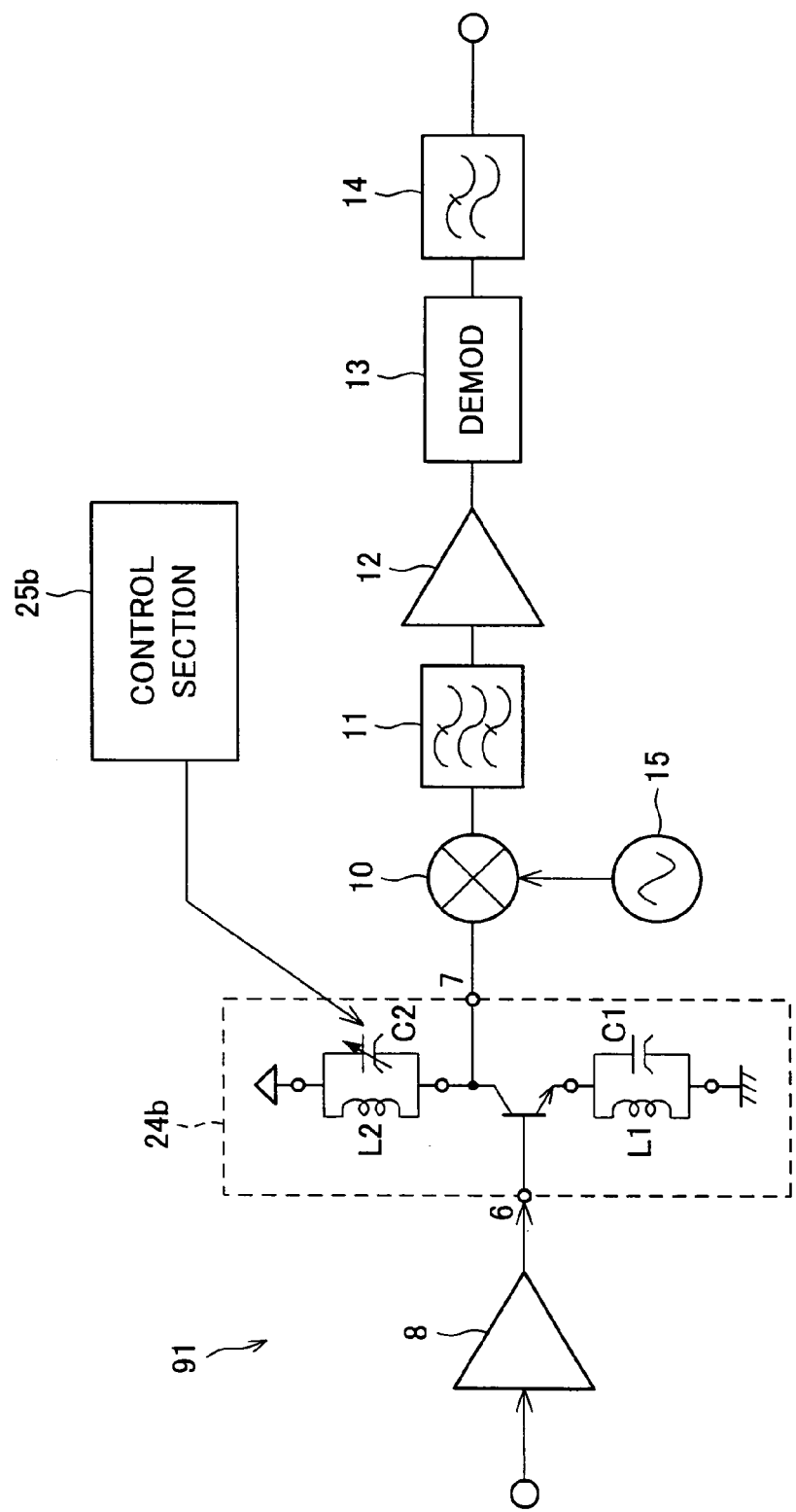
FIG. 4 is a block diagram showing another arrangement of a high-frequency receiver in accordance with an embodiment of the present invention.

Next, FIG. 4 shows an arrangement of another high-frequency receiver 91 in accordance with the present embodiment. Note that, the same reference symbols are assigned to members equivalent to those used in FIG. 12. Further, the members equivalent to those used in FIG. 12 have same functions as those used in FIG. 12, thus their explanation is omitted here. An RF reception signal is amplified by the LNA circuit 8, and supplied to a grounded-emitter circuit 24b. The grounded-emitter circuit 24b is arranged so that the capacitor C2 of the grounded-emitter circuit 71 shown in FIG. 2 is a variable capacitor. Further, a control section (control means) 25b which controls a capacitance value of the capacitor C2 is provided to the high-frequency receiver 91. An output signal of the grounded-emitter circuit 24b is supplied to the frequency converter 10. An LC parallel resonance circuit consisting of the inductor L1 and the capacitor C1 in the grounded-emitter circuit 24b is set to have a resonance frequency in the vicinity of an image frequency of the frequency converter 10. With this, the grounded-emitter circuit 24b, like an image removing filter, remarkably attenuates the image frequency component.

Further, an LC parallel resonance circuit consisting of the inductor L2 and the capacitor C2 in the grounded-emitter circuit 24b is set to have a resonance frequency in the vicinity of a desired input signal frequency of the high-frequency receiver 91. Accordingly, a load impedance Zc with respect to the desired input signal frequency increases, and a current component of the desired input signal frequency which flow through Zc decreases. In other words, a current component of the desired input signal frequency in an output current from the output terminal 7 increases, and the transfer conductance increases. Therefore even if the desired input signal component and the image frequency component are simultaneously supplied to the high-frequency receiver 91, it is possible to increase a level difference between the desired input signal component and the image frequency component. Further, even if the resonance frequency varies due to process variation, etc., it is possible to achieve a desired resonance frequency by adjusting by the control section 25b, a capacitance value of the capacitor C2 in the LC parallel resonance circuit.

Figure 5:
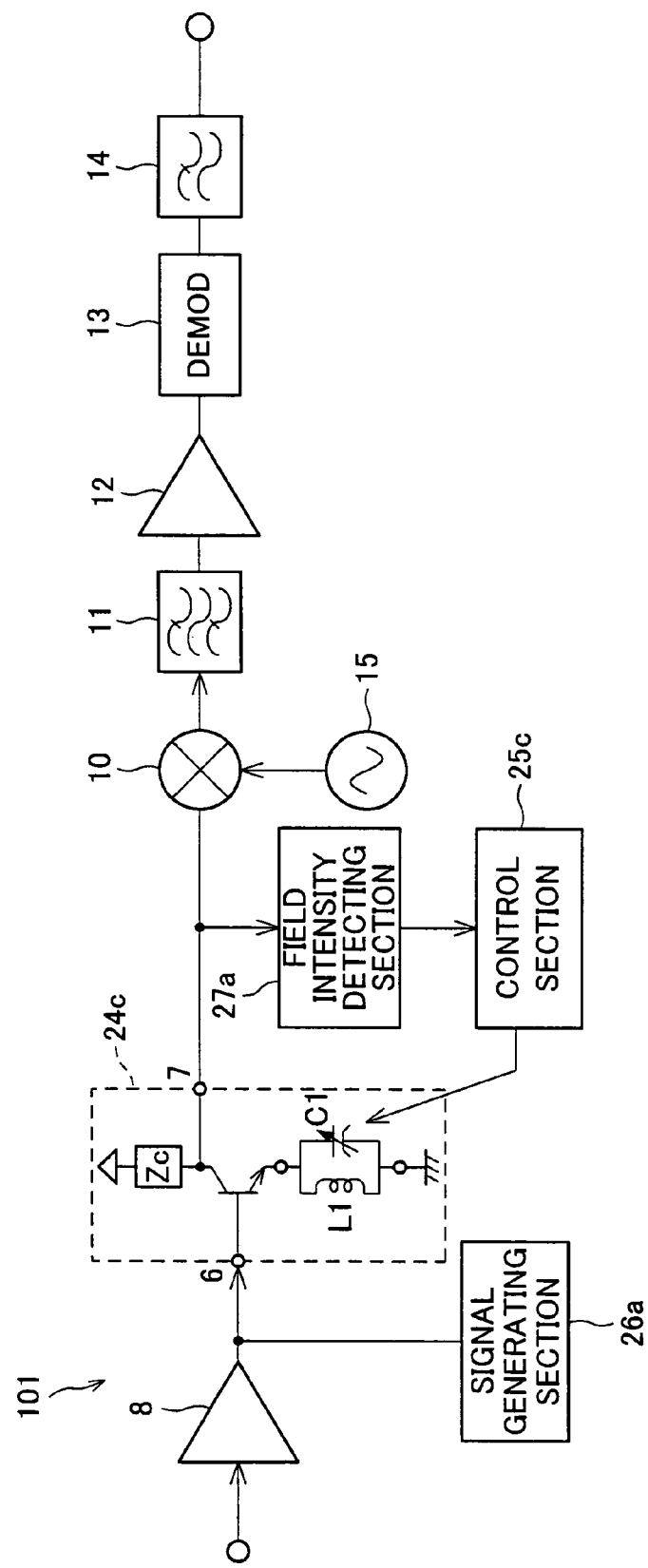
FIG. 5 is a block diagram showing a further arrangement of a high-frequency receiver in accordance with an embodiment of the present invention.

Next, FIG. 5 shows an arrangement of a further high-frequency receiver 101 in accordance with the present embodiment. Note that, the same reference symbols are assigned to members equivalent to those used in FIG. 12. Further, the members equivalent to those used in FIG. 12 have same functions as those used in FIG. 12, thus their explanation is omitted here. An RF reception signal is amplified by the LNA circuit 8, superposed with a signal from a signal generating section (signal generating means) 26a, and supplied to a grounded-emitter circuit 24c. The signal generating section 26a generates a signal whose frequency is equal to an image frequency of the frequency converter 10. When this signal is supplied to the grounded-emitter circuit 24c, the signal is attenuated and output. The grounded-emitter circuit 24c is arranged so that the capacitor C1 of the grounded-emitter circuit 61 shown in FIG. 1 is a variable capacitor. Further, a control section (control means) 25c which controls a capacitance value of the capacitor C1 is provided to the high-frequency receiver 101. An output signal of the grounded-emitter circuit 24c is supplied to the frequency converter 10. A resonance frequency of the LC parallel resonance circuit of the grounded-emitter circuit 24c is set in the vicinity of the image frequency of the frequency converter 10.

A radiation field intensity of the output signal from the output terminal 7 is detected as an output level by a field intensity detecting section (field intensity detecting means) 27a. If the grounded-emitter circuit 24c is operating normally, the field intensity should be sufficiently small because a current component of the image frequency contained in the output signal is small. On the other hand, if the resonance frequency of the LC parallel resonance circuit varies from a desired value due to process variation, etc., the field intensity is large because the grounded-emitter circuit 24c cannot sufficiently attenuate the image frequency signal component. Accordingly, in accordance with the field intensity detected by the field intensity detecting section 27a, the control section 25c optimally adjusts the capacitance value of the capacitor C1 of the LC parallel resonance circuit provided to the grounded-emitter circuit 24c. With these sequential operations, it is possible to automatically control the resonance frequency of the LC parallel resonance circuit even if the resonance frequency varies from a desired value, so as to cause the grounded-emitter circuit 24c to operate normally. Note that, the foregoing sequential operations are carried out during a period when these operations do not affect the receiving operation, such as a period directly after power is applied to the high-frequency receiver 101, for example.

Figure 6:
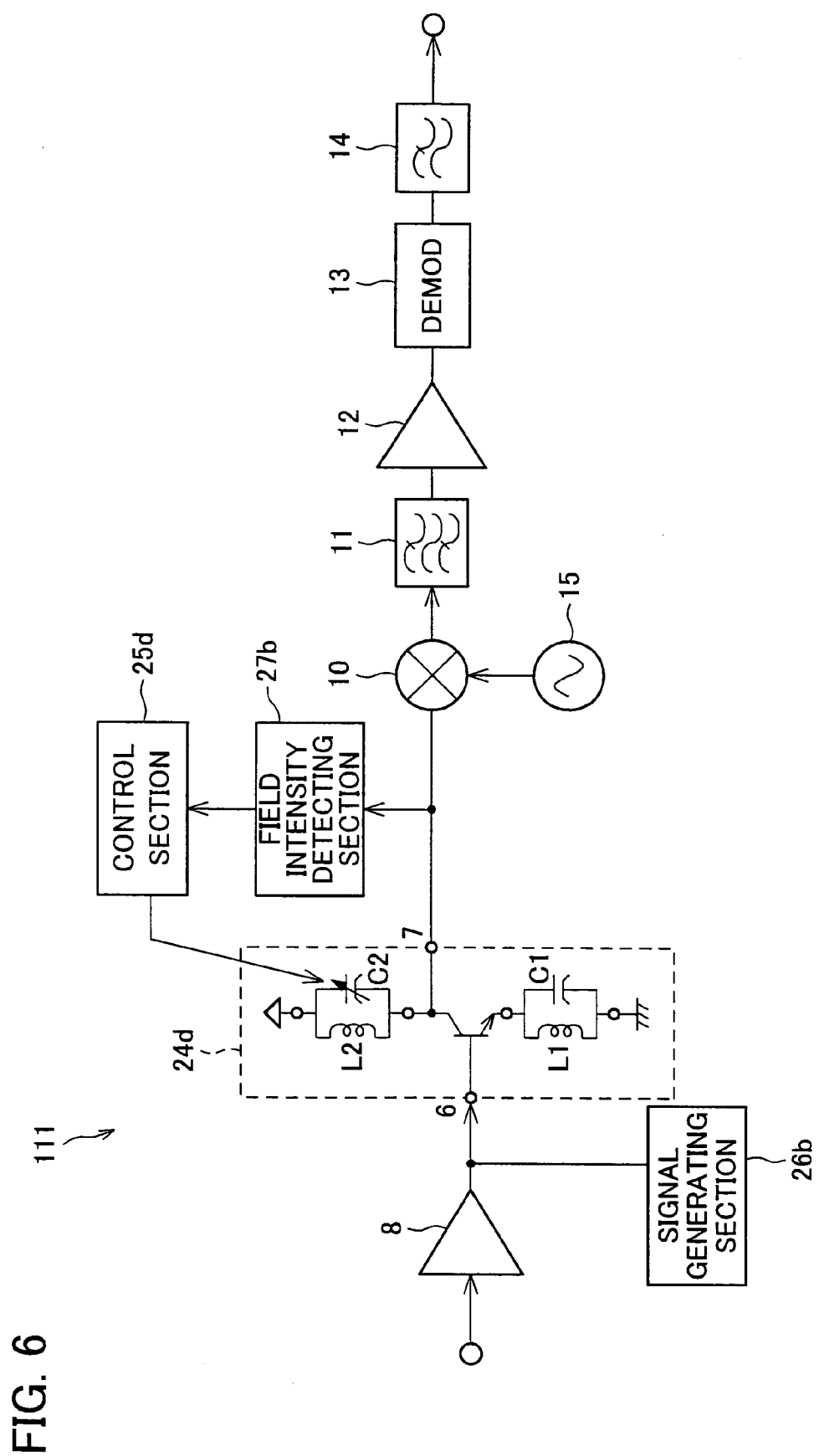
FIG. 6 is a block diagram showing yet another arrangement of a high-frequency receiver in accordance with an embodiment of the present invention.

Next, FIG. 6 shows an arrangement of yet another high-frequency receiver 111 in accordance with the present embodiment. Note that, the same reference symbols are assigned to members equivalent to those used in FIG. 12. Further, the members equivalent to those used in FIG. 12 have same functions as those used in FIG. 12, thus their explanation is omitted here. An RF reception signal is amplified by the LNA circuit 8, superposed with a signal from a signal generating section (signal generating means) 26b, and supplied to a grounded-emitter circuit 24d. The grounded-emitter circuit 24d is arranged so that the capacitor C2 of the grounded-emitter circuit 71 shown in FIG. 2 is a variable capacitor. Further, a control section (control means) 25d which controls a capacitance value of the capacitor C2 is provided to the high-frequency receiver 111. The signal generating section 26b generates a signal whose frequency is equal to a desired signal frequency of the high-frequency receiver 111. This signal is supplied to the grounded-emitter circuit 24d and amplified. An LC parallel resonance circuit composed of the inductor L1 and the capacitor C1 in the grounded-emitter circuit 24d is set to have a resonance frequency in the vicinity of an image frequency of the frequency converter 10. An output signal of the grounded-emitter circuit 24d is supplied to the frequency converter 10.

A radiation field intensity of the output signal from the output terminal 7 is detected as an output level by a field intensity detecting section (field intensity detecting means) 27b. If the grounded-emitter circuit 24d is operating normally, the field intensity should be an appropriate value because a current component of the image frequency in the output signal has an appropriate size. On the other hand, if the resonance frequency of the LC parallel resonance circuit varies from a desired value due to process variation, etc., the grounded-emitter circuit 24d may attenuate the desired reception signal. Accordingly, in accordance with the field intensity detected by the field intensity detecting section 27b, the control section 25d adjusts and determines the capacitance value of the capacitor C2 of the LC parallel resonance circuit provided to the grounded-emitter circuit 24d, so as to cause the grounded-emitter circuit 24d to output the desired reception signal normally. Note that, these sequential operations are carried out during a period when these operations do not affect the receiving operation, such as a period directly after power is applied to the high-frequency receiver 111, for example.

Figure 7:
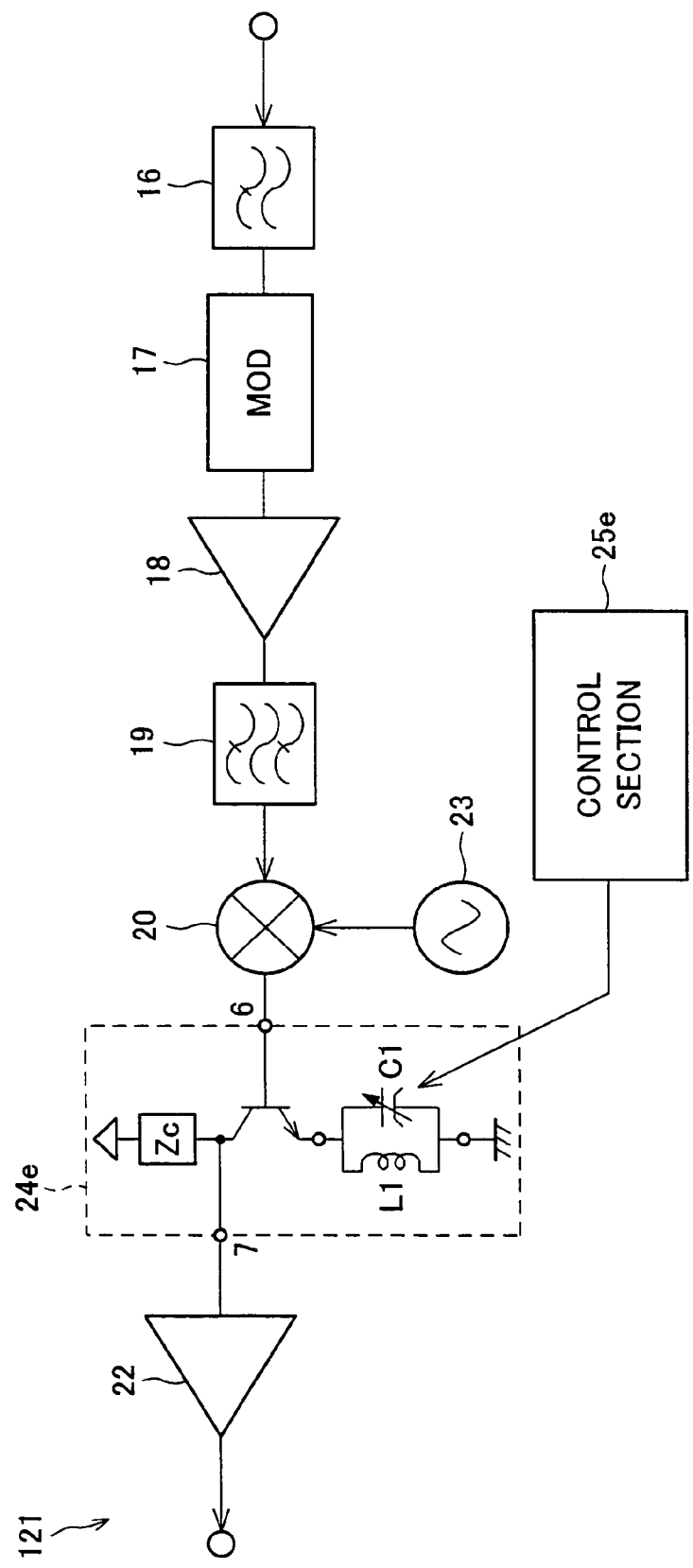
FIG. 7 is a block diagram showing an arrangement of a high-frequency transmitter in accordance with an embodiment of the present invention.
Figure 14:
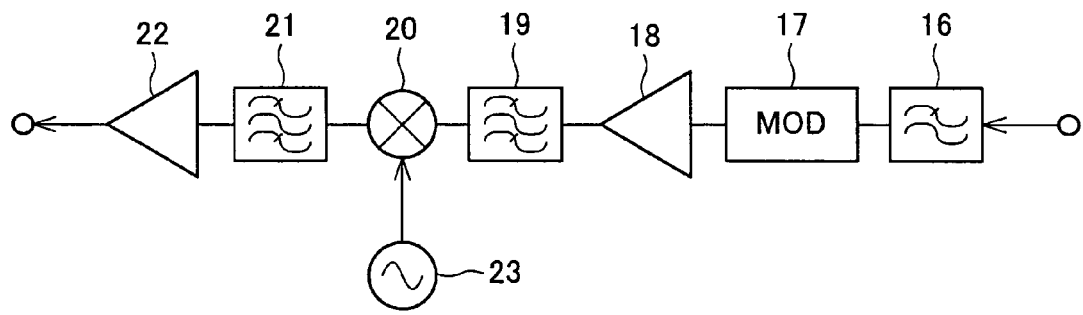
FIG. 14 is a block diagram showing an arrangement of a conventional high-frequency transmitter.
Figure 15:
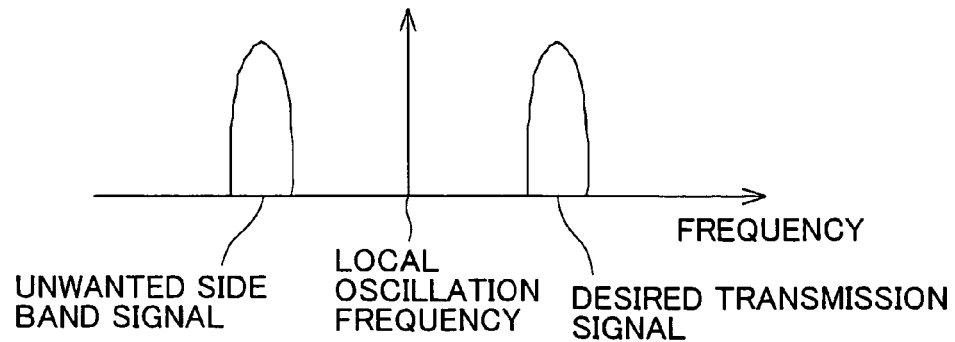
FIG. 15 is a signal spectrum of the high-frequency transmitter of FIG. 14.

Next, FIG. 7 shows an arrangement of a high-frequency transmitter 121 in accordance with the present embodiment. Note that, the same reference symbols are assigned to members equivalent to those used in FIG. 14. Further, the members equivalent to those used in FIG. 14 have same functions as those used in FIG. 14, thus their explanation is omitted here. The frequency converter 20 outputs an unwanted side band signal in addition to a desired frequency signal. These signals are supplied to a grounded-emitter circuit 24e. The grounded-emitter circuit 24e is arranged so that the capacitor C1 of the grounded-emitter circuit 61 shown in FIG. 1 is a variable capacitor. Further, a control section (control means) 25e which controls a capacitance value of the capacitor C1 is provided to the high-frequency transmitter 121. An output signal of the grounded-emitter circuit 24e is supplied to the power amplifier 22. A resonance frequency of the LC parallel resonance circuit of the grounded-emitter circuit 24e is set in the vicinity of the unwanted side band frequency. Accordingly, the transfer conductance for the unwanted side band frequency component is sufficiently small. Thus, when the output signal of the frequency converter 20 is supplied to the grounded-emitter circuit 24e, the signal is output after the unwanted side band frequency component is remarkably attenuated. Therefore the high-frequency transmitter 121 does not require a band-pass filter or an image removing frequency converter for removing the unwanted side band frequency component. Further, even if the resonance frequency varies due to process variation, etc., it is possible to achieve a desired resonance frequency by adjusting by the control section 25e, a capacitance value of the capacitor C1 in the LC parallel resonance circuit.

Figure 8:
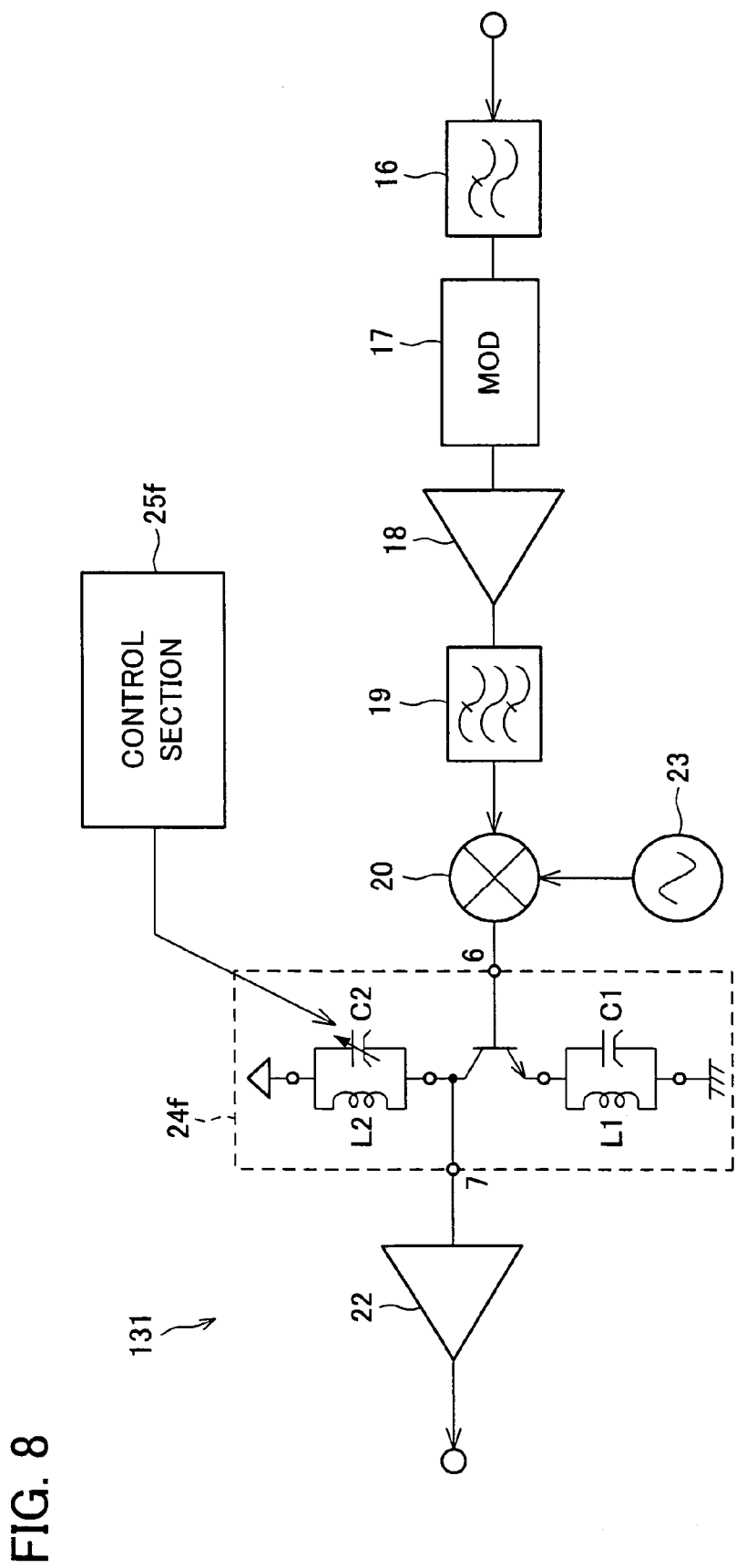
FIG. 8 is a block diagram showing another arrangement of a high-frequency transmitter in accordance with an embodiment of the present invention.

Next, FIG. 8 shows an arrangement of another high-frequency transmitter 131 in accordance with the present embodiment. Note that, the same reference symbols are assigned to members equivalent to those used in FIG. 14. Further, the members equivalent to those used in FIG. 14 have same functions as those used in FIG. 14, thus their explanation is omitted here. The frequency converter 20 outputs an unwanted side band signal in addition to a desired frequency signal. These signal are supplied to a grounded-emitter circuit 24f. The grounded-emitter circuit 24f is arranged so that the capacitor C2 of the grounded-emitter circuit 71 shown in FIG. 2 is a variable capacitor. Further, a control section (control means) 25f which controls a capacitance value of the capacitor C2 is provided to the high-frequency transmitter 131. An output signal of the grounded-emitter circuit 24f is supplied to the power amplifier 22.

A resonance frequency of the LC parallel resonance circuit consisting of the inductor L1 and the capacitor C1 in the grounded-emitter circuit 24f is set in the vicinity of the unwanted side band frequency. Accordingly, the transfer conductance for the unwanted side band frequency component becomes sufficiently small. A resonance frequency of the LC parallel resonance circuit consisting of the inductor L2 and the capacitor C2 in the grounded-emitter circuit 24f is set in the vicinity of the desired output frequency of the high-frequency transmitter 131. Accordingly, the transfer conductance for the desired output frequency component is large. Therefore when the output signal of the frequency converter 20 is supplied to the grounded-emitter circuit 24f, the unwanted side band frequency component is remarkably attenuated, but the desired output frequency component is not attenuated. Further, even if the resonance frequency varies due to process variation, etc., it is possible to achieve a desired resonance frequency by adjusting by the control section 25f, a capacitance value of the capacitor C2 in the LC parallel resonance circuit.

Figure 9:
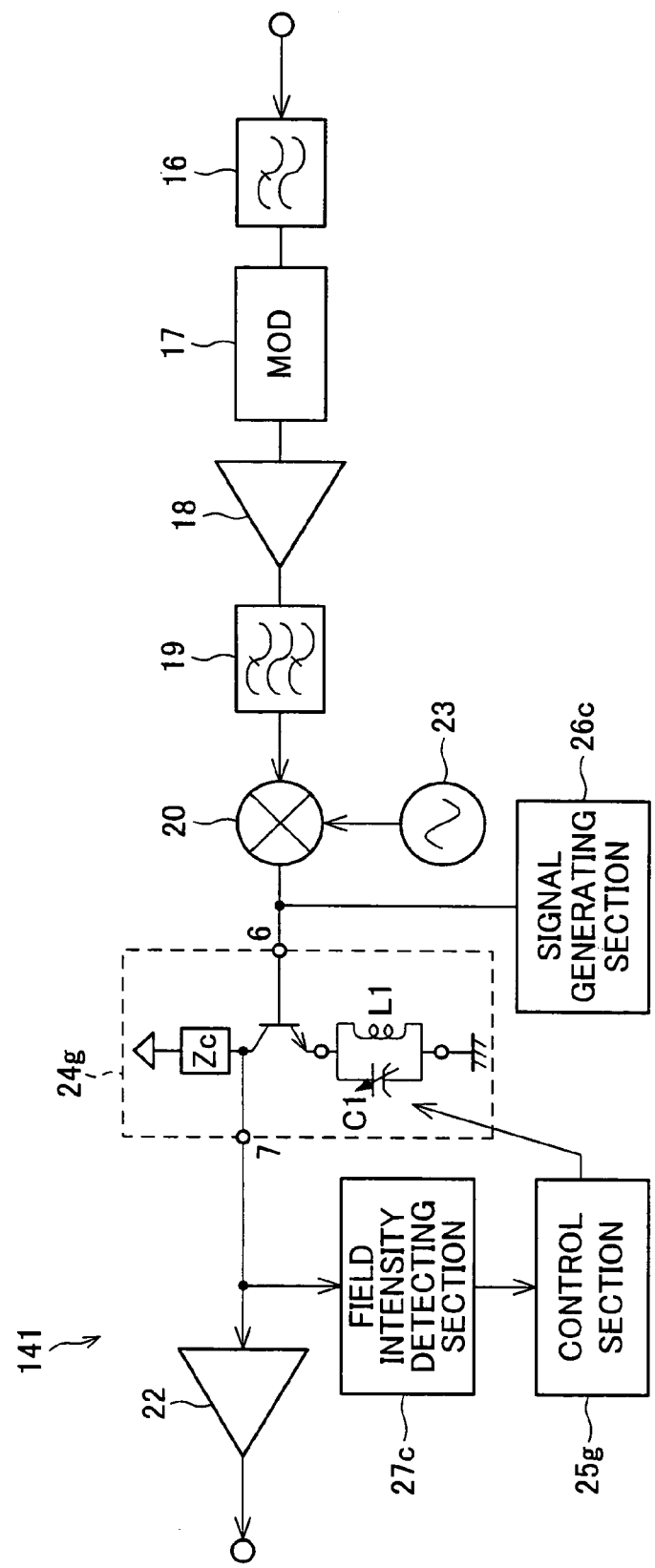
FIG. 9 is a block diagram showing a further arrangement of a high-frequency transmitter in accordance with an embodiment of the present invention.

Next, FIG. 9 shows an arrangement of a further high-frequency transmitter 141 in accordance with the present embodiment. The frequency converter 20 outputs an unwanted side band signal in addition to a desired frequency signal. These signals are superposed with a signal from a signal generating section (signal generating means) 26c, and supplied to a grounded-emitter circuit 24g. The signal generating section 26g is arranged so that the capacitor C1 of the grounded-emitter circuit 61 shown in FIG. 1 is a variable capacitor. Further, a control section (control means) 25g which controls a capacitance value of the capacitor C1 is provided to the high-frequency transmitter 141. A resonance frequency of the LC parallel resonance circuit of the grounded-emitter circuit 24g is set in the vicinity of the unwanted side band frequency. The signal generating section 26c generates a signal whose frequency is equal to the unwanted side band frequency of the frequency converter 20. This signal is supplied to the grounded-emitter circuit 24g and attenuated. An output signal of the grounded-emitter circuit 24g is supplied to the power amplifier 22.

A radiation field intensity of the output signal from the output terminal 7 is detected as an output level by a field intensity detecting section (field intensity detecting means) 27c. If the grounded-emitter circuit 24g is operating normally, the field intensity should be sufficiently small because a current component at a frequency in the vicinity of the unwanted side band frequency is sufficiently small. On the other hand, if the resonance frequency of the LC parallel resonance circuit varies from a desired value due to process variation, etc., the output level is large because the grounded-emitter circuit 24g cannot sufficiently attenuate the unwanted side band frequency component. Accordingly, in accordance with the field intensity detected by the field intensity detecting section 27c, the control section 25g optimally adjusts the capacitance value of the capacitor C1 of the LC parallel resonance circuit provided to the grounded-emitter circuit 24g. With these sequential operations, it is possible to automatically control the resonance frequency of the LC parallel resonance circuit even if the resonance frequency varies from a desired value, so as to cause the grounded-emitter circuit 24g to operate normally. Note that, the foregoing sequential operations are carried out during a period when these operations do not affect the receiving operation, such as a period directly after power is applied to the high-frequency transmitter 141, for example.

Figure 10:
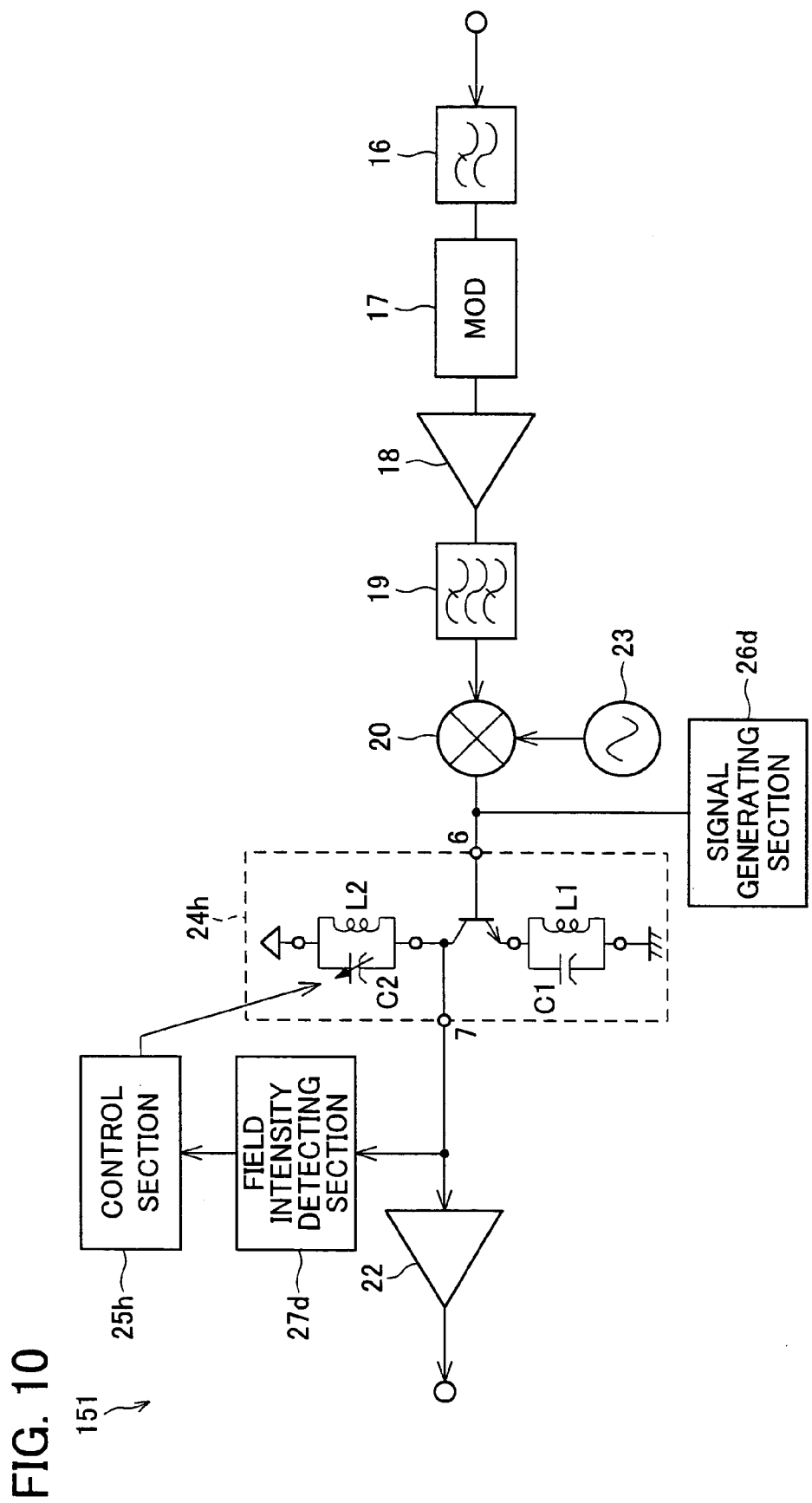
FIG. 10 is a block diagram showing yet another arrangement of a high-frequency transmitter in accordance with an embodiment of the present invention.

Next, FIG. 10 shows an arrangement of yet another high-frequency receiver 151 in accordance with the present embodiment. The frequency converter 20 outputs an unwanted side band signal in addition to a desired frequency signal. These signals are superposed with a signal from a signal generating section (signal generating means) 26d, and supplied to a grounded-emitter circuit 24h. The signal generating section 26h is arranged so that the capacitor C2 of the grounded-emitter circuit 71 shown in FIG. 2 is a variable capacitor. Further, a control section (control means) 25h which controls a capacitance value of the capacitor C2 is provided to the high-frequency transmitter 151. The signal generating section 26d generates a signal whose frequency is equal to the desired output frequency of the high-frequency transmitter 151. This signal is supplied to the grounded-emitter circuit 24h and amplified. A resonance frequency of the LC parallel resonance circuit consisting of the inductor L1 and the capacitor C1 in the grounded-emitter circuit 24h is set in the vicinity of the unwanted side band frequency of the frequency converter 20. An output signal of the grounded-emitter circuit 24h is supplied to the power amplifier 22.

A radiation field intensity of the output signal from the output terminal 7 is detected as an output level by a field intensity detecting section (field intensity detecting means) 27d. If the grounded-emitter circuit 24h is operating normally, the field intensity should be an appropriate value. On the other hand, if the resonance frequency of the LC parallel resonance circuit consisting of the inductor L2 and the capacitor C2 varies from a desired value due to process variation, etc., the grounded-emitter circuit 24h may attenuate the desired output frequency signal. Accordingly, in accordance with the field intensity detected by the field intensity detecting section 27d, the control section 25h adjusts and determines the capacitance value of the capacitor C2 of the LC parallel resonance circuit provided to the grounded-emitter circuit 24h, so as to cause the grounded-emitter circuit 24h to output the desired output frequency signal normally. Note that, these sequential operations are carried out during a period when these operations do not affect the receiving operation, such as a period directly after power is applied to the high-frequency transmitter 151, for example.

As explained above, the grounded-emitter circuit of the present invention can attenuate using a simple circuit configuration, a specific frequency component. Further, by providing the grounded-emitter circuit of the present invention to a high-frequency receiver, it is possible to attenuate an image frequency component which becomes a problem in a frequency converter. Further, by providing the grounded-emitter circuit of the present invention to a high-frequency transmitter, it is possible to attenuate an unwanted side band component.

The present invention can be suitably used in a transmitter and receiver employing a heterodyne system.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A high-frequency receiver, comprising:
a frequency converter; and
a grounded-emitter circuit provided at a preceding stage of said frequency converter, said grounded-emitter circuit including (A) a transistor, (B) a first impedance circuit connected between a collector of said transistor and a reference voltage source, and (C) a second impedance circuit connected between an emitter of said transistor and GND, and composed of a parallel resonance circuit consisting of an inductor and a capacitor,
a resonance frequency of the parallel resonance circuit of said second impedance circuit being set in a vicinity of an image frequency of said frequency converter.

2. A high-frequency receiver, comprising:
a frequency converter; and
a grounded-emitter circuit provided at a preceding stage of said frequency converter, said grounded-emitter circuit including (A) a transistor, (B) a first impedance circuit connected between a collector of said transistor and a reference voltage source, and (C) a second impedance circuit connected between an emitter of said transistor and GND, and composed of a parallel resonance circuit consisting of an inductor and a capacitor, said first impedance circuit being a parallel resonance circuit consisting of an inductor and a capacitor and having a resonance frequency different from a resonance frequency of said second impedance circuit,
the resonance frequency of the parallel resonance circuit of said second impedance circuit being set in a vicinity of an image frequency of said frequency converter,
the resonance frequency ofthe parallel resonance circuit of said first impedance circuit being set in a vicinity of a desired signal frequency of said receiver.

3. A high-frequency receiver, comprising:
a frequency converter;
a grounded-emitter circuit provided at a preceding stage of said frequency converter, said grounded-emitter circuit including (A) a transistor, (B) a first impedance circuit connected between a collector of said transistor and a reference voltage source, and (C) a second impedance circuit connected between an emitter of said transistor and GND, and composed of a parallel resonance circuit consisting of an inductor and a capacitor, the capacitor of said second impedance circuit being a variable capacitor; and
a control section controlling the variable capacitor of said second impedance circuit.

4. A high-frequency receiver, comprising:
a frequency converter;
a grounded-emitter circuit provided at a preceding stage of said frequency converter, said grounded-emitter circuit including (A) a transistor, (B) a first impedance circuit connected between a collector of said transistor and a reference voltage source, and (C) a second impedance circuit connected between an emitter of said transistor and GND, and composed of a parallel resonance circuit consisting of an inductor and a capacitor, said first impedance circuit being a parallel resonance circuit consisting of an inductor and a capacitor and having a resonance frequency different from a resonance frequency of said second impedance circuit, the capacitor of said first impedance circuit being a variable capacitor; and
a control section controlling the variable capacitor of said first impedance circuit.

5. A high-frequency receiver, comprising:
a frequency converter;
a grounded-emitter circuit provided at a preceding stage of said frequency converter, said grounded-emitter circuit including (A) a transistor, (B) a first impedance circuit connected between a collector of said transistor and a reference voltage source, and (C) a second impedance circuit connected between an emitter of said transistor and GND, and composed of a parallel resonance circuit consisting of an inductor and a capacitor, the capacitor of said second impedance circuit being a variable capacitor;
a signal generating section generating a signal whose frequency is equal to an image frequency of said frequency converter;
a field intensity detecting section detecting an output level of said grounded-emitter circuit; and
a control section controlling in accordance with a detected level of the output level, a capacitance value of the variable capacitor of said second impedance circuit.

6. The high-frequency receiver as set forth in claim 5, wherein:
said control section attenuates the output level of said grounded-emitter circuit by changing the capacitance value of the variable capacitor of said second impedance circuit, if the output level of said grounded-emitter circuit is higher than a desired level.

7. A high-frequency receiver, comprising:
a frequency converter;
a grounded-emitter circuit provided at a preceding stage of said frequency converter, said grounded-emitter circuit including (A) a transistor, (B) a first impedance circuit connected between a collector of said transistor and a reference voltage source, and (C) a second impedance circuit connected between an emitter of said transistor and GND, and composed of a parallel resonance circuit consisting of an inductor and a capacitor, said first impedance circuit being a parallel resonance circuit consisting of an inductor and a capacitor and having a resonance frequency different from a resonance frequency of said second impedance circuit, the capacitor of said first impedance circuit being a variable capacitor;
a signal generating section generating a signal whose frequency is equal to a desired signal frequency of said receiver;

a field intensity detecting section detecting an output level of said grounded-emitter circuit; and a control section controlling in accordance with a detected level of the output level, a capacitance value of the variable capacitor of said first impedance circuit.

8. The high-frequency receiver as set forth in claim 7, wherein:

said control section increases the output level of said grounded-emitter circuit by changing the capacitance value of the variable capacitor of said first impedance circuit, if the output level of said grounded-emitter circuit is lower than a desired level.

* * * * *